Patented Jan. 23, 1945

2,367,827

UNITED STATES PATENT OFFICE 2,367,827

ACCELERATOR FOR VULCANIZATION OF RUBBER

George E. P. Smith, Jr., Akron, Ohio, assignor to The Firestone Tire & Rubber Company, Akron, Ohio, a corporation of Ohio No Drawing. Application October 30, 1941, Serial No. 417,163

12 Claims. (Cl. 260—788)

This invention relates to the vulcanization of rubber, and relates especially to a new class of chemical compounds which are valuable accelerators for the vulcanization of rubber or rubber-like substances.

It is a primary object of the present invention to provide a new class of accelerators for the vulcanization of natural or synthetic rubber.

Another object is to provide a class of improved rubber vulcanization accelerators of the delayed action, non-scorching type.

Another object is to provide a class of improved rubber vulcanization accelerators, which are solids, easily incorporated in rubber, stable in storage, and commercially practical.

Another object is to provide a method of vulcanizing rubber whereby scorching or pre-vulcanization during processing of the rubber compound is prevented, but extremely rapid vulcanization is obtained at customary vulcanizing temperatures.

Another object is to provide improved rubber compositions possessing the ability to vulcanize extremely rapidly at ordinary vulcanizing temperatures, but free from any tendency to set-up or pre-vulcanize at rubber processing temperatures.

A further object is to provide vulcanized rubber of improved quality, possessing the characteristics of high modulus and tensile, low hysteresis and a high inherent resistance to deterioration by flexing or aging.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of an aromatic 2-mercaptothiazole and a dialkyl- or trialkyl-carbinamine. The preparative oxidation reaction may be effected by treating a mixture of the mercaptothiazole and an excess of the amine in an alkaline aqueous medium with one of the following oxidizing agents: chlorine, bromine, iodine, hypochlorous acid, hypobromous acid, hypoiodous acid, and alkali metal and alkaline earth metal salts of said acids. The oxidation reaction is believed to comprise the direct action of a hypohalous acid, or an alkali metal or an alkaline earth metal salt thereof, on a mixture of the mercaptothiazole and one equivalent of the amine. The desired substances produced by this oxidation reaction are organic compounds containing nitrogen and sulfur.

This new class of accelerators is believed to possess the following type formula:

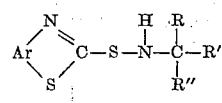

wherein Ar is an orthoarylene radical, R and R' are alkyl radicals, and R'' is hydrogen or an alkyl radical. Thus, the new compounds are believed to be derivatives of sulfenamide (HSNH$_2$). Examples of orthoarylene radicals include benzo, 4-phenylbenzo, 6-phenylbenzo, naphtho, and homologs or the various ring substitution products of these radicals; as typical ring substituents there may be mentioned nitro, halogen, hydroxy and alkoxy groups. Examples of alkyl radicals include methyl, ethyl, propyl, butyl, amyl, hexyl, heptyl, octyl and similar radicals.

The following specific examples are given in further illustration of the invention.

Example 1

An aqueous solution containing isopropylamine, the sodium salt of mercaptobenzothiazole and sodium hydroxide, in the molecular proportions of 12 to 1 to 2, respectively, was treated with a conventional aqueous potassium iodide solution of iodine until the reaction solution contained no more of the mercaptobenzothiazole salt. A solid product separated from the reaction mixture. Recrystallization of this solid product from ether produced a stable, white crystalline substance melting at 93–94° C. This substance is believed to be N-isopropyl-2-benzothiazyl sulfenamide, having the formula

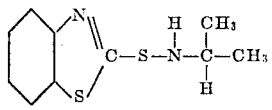

The above sulfenamide was tested as an accelerator by comparing it with the standard accelerators, mercaptobenzothiazole and dibenzothiazyl disulfide, the latter being a delayed action accelerator, in the following rubber formula:

| Ingredients | Parts by weight |
| --- | --- |
| Rubber (smoked sheets) | 100.00 |
| Sulfur | 3.00 |
| Zinc oxide | 5.00 |
| Stearic acid | 1.00 |
| Accelerator | 0.75 |

Samples of the three rubber compositions, so formulated, were heated for 30 minutes at 240° F. to determine whether or not they possessed any tendency to pre-vulcanize or set-up during proccessing steps prior to the usual vulcanizing step, and the following physical testing data were obtained:

| Accelerator | Modulus of elasticity in lbs./in.² at elongation of 600% | Tensile strength in lbs./in.² at break |
| --- | --- | --- |
| Mercaptobenzothiazole | 375 | 2,175. |
| Dibenzothiazyl disulfide | No cure | No cure. |
| N-isopropyl-2-benzothiazyl sulfenamide | do | Do. |

Other samples of the aforesaid rubber compositions were heated for 20 minutes at 280° F. to determine the relative accelerating properties of the respective accelerators, and the following data were obtained:

| Accelerator | Modulus of elasticity in lbs./in.² at elongation of 600% | Tensile strength in lbs./in.² at break |
| --- | --- | --- |
| Mercaptobenzothiazole | 650 | 2,550 |
| Dibenzothiazyl disulfide | 525 | 2,450 |
| N-isopropyl-2-benzothiazyl sulfenamide | 2,225 | 4,250 |

The two sets of testing data given above show that the sulfenamide derivative from isopropylamine and mercaptobenzothiazole is an excellent delayed-action accelerator, since the rubber composition including it did not vulcanize at the relatively low temperature of 240° F., in contrast with the composition including the standard accelerator, mercaptobenzothiazole. Furthermore, the new accelerator imparted very high physical properties to the rubber composition after a short cure at 280° F., in comparison with mercaptobenzothiazole and the standard delayed-action accelerator, dibenzothiazyl disulfide.

*Example 2*

Three further sulfenamides were prepared by the procedure of Example 1, the 12 molecular parts of isopropylamine of that example being replaced successively by 9 molecular parts of sec. butylamine (methyl-ethyl-carbinamine), 5 molecular parts of sec. amylamine (methyl-n-propyl-carbinamine), and 5 molecular parts of sec. hexylamine (methyl-isobutyl-carbinamine). The following stable, white solids were obtained in good yields:

| 2-benzothiazyl sulfenamide | Melting point |
| --- | --- |
| | °C. |
| N-sec. butyl | 59-61 |
| N-sec. amyl- (or N-methyl-n-propyl-carbin-) | 58-60 |
| N-sec. hexyl- (or N-methyl-isobutyl-carbin-) | 52-54 |

The above new compounds were tested in the manner set out in Example 1, the same two control accelerators being utilized. Samples of the various rubber compositions were heated at 240° F. for 30 and 60 minutes to detect any tendency to prevulcanize at maximum processing temperatures, and the following physical testing results were observed:

| Accelerator | Modulus of elasticity in lbs./in.² at 600% elongation | | Tensile strength in lbs./in.² at break | |
| --- | --- | --- | --- | --- |
| Cure in minutes | 30 | 60 | 30 | 60 |
| Mercaptobenzothiazole | 400 | 750 | 2,250 | 2,800. |
| Dibenzothiazyl disulfide | No cure | No cure | No cure | No cure. |
| N-sec. butyl-2-benzothiazyl sulfenamide | do | do | do | Do. |
| N-sec. amyl-2-benzothiazyl sulfenamide | do | do | do | Do. |
| N-sec. hexyl-2-benzothiazyl sulfenamide | do | do | do | Do. |

Other samples of the same rubber compositions were heated at 280° F. for 20 and 40 minutes, and the following data were obtained:

| Accelerator | Modulus of elasticity in lbs./in.² at 600% elongation | | Tensile strength in lbs./in.² at break | |
| --- | --- | --- | --- | --- |
| Cure in minutes | 20 | 40 | 20 | 40 |
| Mercaptobenzothiazole | 650 | 650 | 2,550 | 2,700 |
| Dibenzothiazyl disulfide | 450 | 700 | 2,150 | 2,725 |
| N-sec. butyl-2-benzothiazyl sulfenamide | 950 | 2,900 | 2,825 | 3,625 |
| N-sec. amyl-2-benzo-thiazyl sulfenamide | 1,550 | 2,650 | 3,350 | 3,900 |
| N-sec. hexyl-2-benzo-thiazyl sulfenamide | 700 | 2,800 | 2,675 | 3,600 |

The two sets of data appearing immediately hereinabove further demonstrate that sulfenamide derivatives obtainable from orthoarylene-mercaptothiazoles and dialkyl carbinamines are excellent delayed action accelerators for the vulcanization of rubber.

*Example 3*

Ten grams of mercaptobenzothiazole were dissolved in a water solution of 5 grams of sodium hydroxide, and the resulting solution was mixed with 21 grams of tert. amylamine (dimethylethyl carbinamine). The mixture was stirred, and a potassium iodide solution containing 15.2 grams of free iodine was gradually added thereto during the course of 3 hours. The reaction mixture was extracted with ether, the ether was then evaporated, and the resulting residue was recrystallized from petroelum ether. The recrystalized product was a white crystalline solid melting at 80–82° C., and is believed to be N-tert.

amyl-2-benzothiazyl sulfenamide, of the formula

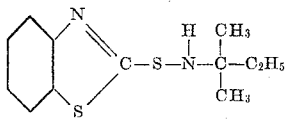

The new product was tested as an accelerator in the formula given in Example 1, the same control accelerators being used, and the curing time being 20 and 40 minutes at 280° F. The following physical testing data were obtained:

| Accelerator | Modulus of elasticity in lbs./in.$^2$ at 600% elongation | | Tensile strength in lbs./in.$^2$ at break | |
|---|---|---|---|---|
| Cure in minutes | 20 | 40 | 20 | 40 |
| Mercaptobenzothiazole | 625 | 750 | 2,700 | 2,900 |
| Dibenzothiazyl disulfide | 400 | 625 | 2,050 | 2,475 |
| N-tert. amyl-2-benzo-thiazyl sulfenamide | 1,300 | 2,650 | 3,250 | 3,650 |

The above data show that the sulfenamide from a trialkyl carbinamine is a very effective accelerator at normal vulcanizing temperatures. Other tests have indicated that the new product is a practical delayed action accelerator, causing no vulcanization of a rubber compound under usual processing conditions at which a corresponding compound containing the accelerator, mercaptobenzothiazole, becomes partially vulcanized or set-up.

The preferred class of sulfenamide derivatives may be prepared by other methods than those mentioned hereinabove, as will be apparent to one skilled in the art. For example, a mixture of an aromatic 2-mercaptothiazole and a dialkyl- or trialkylcarbinamine may be oxidized by hydrogen peroxide or other conventional oxidizing agent. The invention is not limited to derivatives prepared in accordance with any particular method, but includes the preferred class of accelerators, however they may have been manufactured.

The new accelerators are equally effective in rubber tread compounds, latex compounds or other conventional vulcanizable compounds of rubber or synthetic rubber. The various vulcanizable synthetic rubbers are herein considered equivalent to rubber, examples being the Buna types (polymers essentially derived from butadiene), such as Buna N (copolymer of butadiene and acrylonitrile) and Buna S (copolymer of butadiene and styrene). Although sulfur has hereinabove been mentioned as the vulcanizing agent preferred in practicing the invention, other conventional vulcanizing agents susceptible to acceleration are contemplated.

The preferred compounds are seen to be very rapid accelerators at conventional vulcanizing temperatures, imparting unusually high modulus and tensile characteristics to the vulcanized rubber, but they are of the delayed action type, in that vulcanizable compositions including them do not set-up or pre-vulcanize under conventional rubber processing conditions. The vulcanized products have been found to be highly efficient, having low hysteresis characteristics, and to be unusually resistant to deterioration on flexing or aging.

A further common characteristic of the new class of accelerators, which has an important bearing on their practicality, is their chemical stability in storage. Various members of the preferred class have been stored and have been found to be substantially or completely unchanged after several months. In contrast to this stability, it has been observed that, under similar storage conditions, certain members of the general class of compounds, N-alkyl-2-arylenethiazyl sulfenamides, to which the preferred class belongs, are substantially decomposed after only a few weeks or months. Such unstable compounds include N-n-amyl-2-benzothiazyl sulfenamide and N-ethyl-2-benzothiazyl sulfenamide, and are not members of the preferred class of accelerators herein.

Conventional accelerator activators may be employed to an advantage with the new class of accelerators when extremely rapid vulcanization is desired, especially at lower temperatures. Also, the new accelerators may be used in combination with other accelerators, such as a guanidine (e. g., diphenyl guanidine) or a conventional mercaptothiazole derivative (e. g., mercaptobenzothiazole or dibenzothiazyl disulfide), in order to produce rubber compositions having especially rapid or specific vulcanizing properties.

Although the invention has been described in detail in accordance with the requirements of the patent statutes, it is not limited to the specific examples given herein. The invention includes all features of patentable novelty residing in the foregoing disclosure.

What is claimed is:

1. The method of vulcanizing rubber which includes heating rubber and sulfur in the presence of N-isopropyl-2-benzothiazyl sulfenamide.

2. The method of vulcanizing rubber which includes heating rubber and sulfur in the presence of N-sec. butyl-2-benzothiazyl sulfenamide.

3. The method of vulcanizing rubber which includes heating rubber and sulfur in the presence of a N-sec. amyl-2-benzothiazyl sulfenamide.

4. The method of vulcanizing rubber which includes heating rubber and a vulcanizing agent in the presence of a substance having the formula

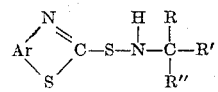

wherein Ar is an orthoarylene radical, R and R' are alkyl radicals, and R'' is one of the group consisting of hydrogen and alkyl radicals.

5. A vulcanizable rubber composition including sulfur and N-isopropyl-2-benzothiazyl sulfenamide.

6. A vulcanizable rubber composition including sulfur and N-sec. butyl-2 benzothiazyl sulfenamide.

7. A vulcanizable rubber composition including sulfur and a N-sec. amyl-2-benzothiazyl sulfenamide.

8. A vulcanizable rubber composition including a vulcanizing agent and a substance having the formula wherein Ar is an orthoarylene radical, R and R' are alkyl radicals, and R'' is one of the group consisting of hydrogen and alkyl radicals.

9. A vulcanized rubber product prepared by heating rubber and sulfur in the presence of N-isopropyl-2-benzothiazyl sulfenamide.

10. A vulcanized rubber product prepared by heating rubber and sulfur in the presence of N-sec. butyl-2-benzothiazyl sulfenamide.

11. A vulcanized rubber product prepared by heating rubber and sulfur in the presence of a N-sec. amyl-2-benzothiazyl sulfenamide.

12. A vulcanized rubber product prepared by heating rubber and a vulcanizing agent in the presence of a substance having the formula

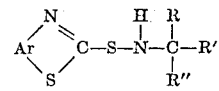

wherein Ar is an orthoarylene radical, R and R' are alkyl radicals, and R'' is one of the group consisting of hydrogen and alkyl radicals.

GEORGE E. P. SMITH, Jr.